United States Patent
Mota et al.

(10) Patent No.: US 10,735,481 B2
(45) Date of Patent: Aug. 4, 2020

(54) MULTIPLE WEB CONFERENCE SCREEN DISPLAY SHARING

(71) Applicant: International Business Machines Corporation, Armonk, NY (US)

(72) Inventors: Helio Leonardo Pinheiro e Mota, Ridgefield, CT (US); Thiago Rodrigues de Souza Costa, Belem (BR); Wiliam P. Righi, Porto Alegre (BR); Marcelo D. Siqueira, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 16/005,090

(22) Filed: Jun. 11, 2018

(65) Prior Publication Data

US 2019/0379712 A1     Dec. 12, 2019

(51) Int. Cl.
*H04L 29/06* (2006.01)
*H04L 12/911* (2013.01)

(52) U.S. Cl.
CPC .......... *H04L 65/403* (2013.01); *H04L 47/82* (2013.01); *H04L 65/1069* (2013.01); *H04L 65/4076* (2013.01); *H04L 69/16* (2013.01)

(58) Field of Classification Search
CPC ... H04L 65/403; H04L 47/82; H04L 65/1069; H04L 65/4076; H04L 69/16
See application file for complete search history.

(56) References Cited

U.S. PATENT DOCUMENTS

| 9,288,259 B2* | 3/2016 | Shao ..................... H04L 67/10 |
| 9,621,853 B1 | 4/2017 | Yang et al. |
| 9,699,409 B1* | 7/2017 | Reshef .................. H04N 7/155 |
| 9,948,786 B2* | 4/2018 | Rosenberg ........... H04L 65/403 |
| 2010/0306306 A1* | 12/2010 | Kamay ............... G06F 9/45558 709/203 |
| 2012/0317485 A1* | 12/2012 | Ding .................... G06F 3/1454 715/719 |
| 2013/0106989 A1 | 5/2013 | Gage et al. |
| 2013/0162753 A1* | 6/2013 | Hendrickson ....... H04L 12/1818 348/14.08 |

(Continued)

*Primary Examiner* — Ranodhi Serrao
*Assistant Examiner* — Raqiul A Choudhury
(74) *Attorney, Agent, or Firm* — Michael Petrocelli, Esq.; George S. Blasiak, Esq.; Heslin Rothenberg Farley & Mesiti, PC

(57) ABSTRACT

Methods, computer program products, and systems are presented. The method computer program products, and systems can include, for instance: receiving from a presenter local client computer device an iteratively captured screen display of the presenter local client computer device; multicasting the iteratively received captured screen display to a first virtual machine and a second virtual machine, the first virtual machine running a first provider specific web conference client application associated to a first web conference provider system, the second virtual machine running a second provider specific web conference client application associated to a second web conference provider system, and cloning by the first virtual machine and the second virtual machine the iteratively captured screen display to provide respective instances of a cloned iteratively captured screen display.

19 Claims, 8 Drawing Sheets

(56) References Cited

U.S. PATENT DOCUMENTS

| | | | |
|---|---|---|---|
| 2014/0289646 A1* | 9/2014 | Munir | H04L 65/1093 715/753 |
| 2014/0313278 A1* | 10/2014 | Periyannan | H04L 65/403 348/14.08 |
| 2015/0039357 A1* | 2/2015 | Segal | G06Q 10/06314 705/5 |
| 2015/0106520 A1* | 4/2015 | Breitgand | G06F 9/45558 709/226 |
| 2016/0019081 A1* | 1/2016 | Chandrasekaran | G06F 9/45558 718/1 |
| 2017/0017509 A1* | 1/2017 | Tan | G06F 9/45558 |
| 2017/0149587 A1 | 5/2017 | Chaturvedi et al. | |
| 2017/0208212 A1* | 7/2017 | Tsukamoto | H04N 7/152 |

* cited by examiner

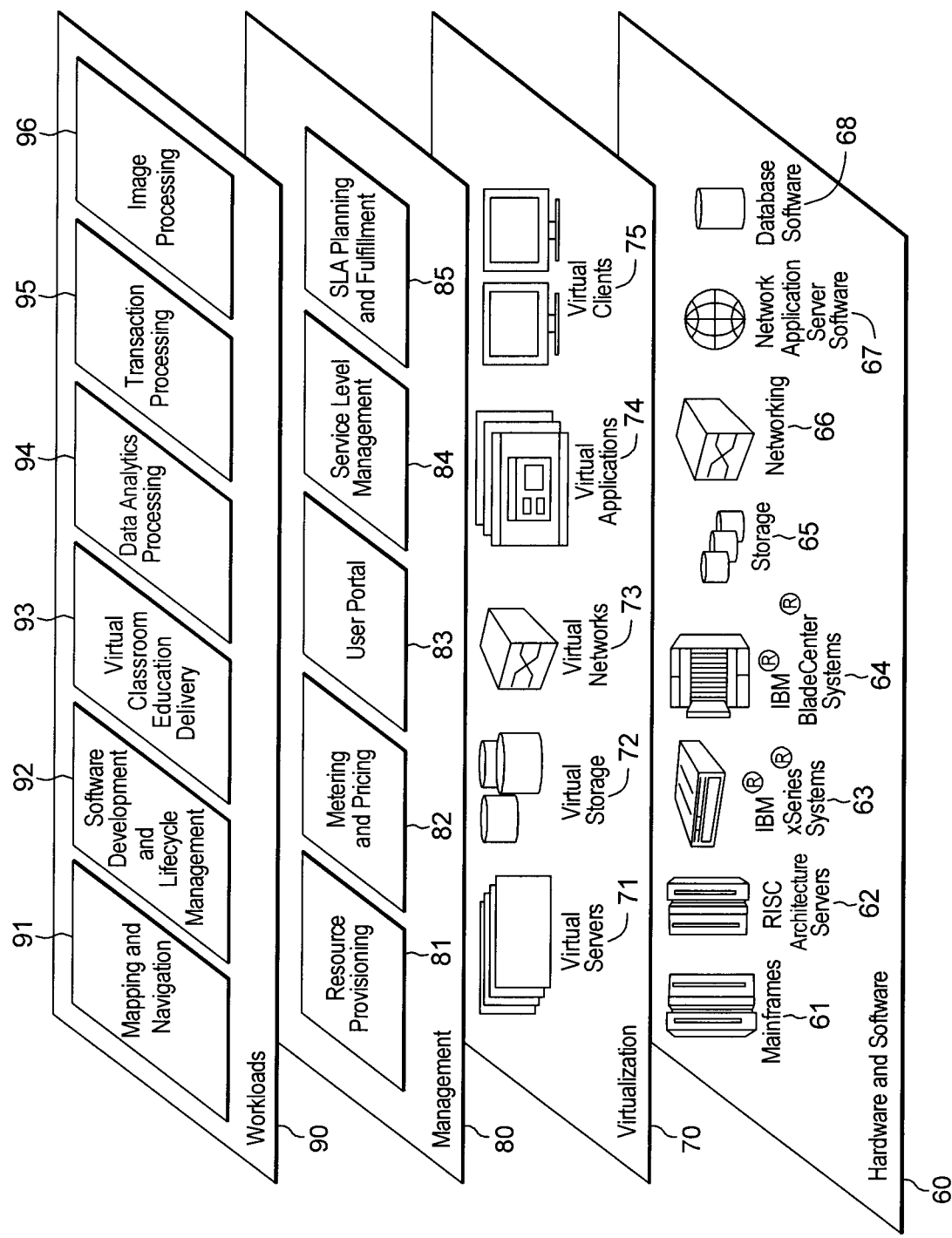

MULTIPLE WEB CONFERENCE SCREEN DISPLAY SHARING

BACKGROUND

Web conferencing is enabled by interest technologies including TCP/IP communication protocols. Services can include, e.g. multicast communications from one sender to many receivers and/or real-time point to point communications. Web conferencing can provide data streams of text based messages, voice, and video chat to be shared simultaneously, including over wide geographical areas. Applications for web conferencing include, e.g. presentations from a web connected computer to other web connected computers, training events, meetings, and lectures. Features of a web conference can include virtual whiteboard with annotation. Virtual whiteboard features allow the presenter and/or viewers to highlight items on a slide presentation. Features of web conference can include, e.g. screen sharing, desktop sharing, application sharing where participants can view any content a presenter currently has on the presenter's screen. Screen sharing applications can allow for remote desktop control, allowing participants to manipulate the presenter's screen.

SUMMARY

Shortcomings of the prior art are overcome, and additional advantages are provided, through the provision, in one aspect, of a method. The method can include, for example: receiving from a presenter local client computer device an iteratively captured screen display of the presenter local client computer device; multicasting the iteratively received captured screen display to a first virtual machine and a second virtual machine, the first virtual machine running a first provider specific web conference client application associated to a first web conference provider system, the second virtual machine running a second provider specific web conference client application associated to a second web conference provider system, and cloning by the first virtual machine and the second virtual machine the iteratively captured screen display to provide respective instances of a cloned iteratively captured screen display; sending by the first virtual machine a first instance of the cloned virtual screen display to the first web conference provider system for sharing with a first one or more viewer local client computer device connected to the first web conference provider system and participating in a web conference supported by the first web conference provider system; and sending by the second virtual machine a second instance of the cloned virtual screen display to the second web conference provider system for sharing with a second one or more viewer local client computer device connected to the second web conference provider system and participating in a web conference supported by the second web conference provider system.

In another aspect, a computer program product can be provided. The computer program product can include a computer readable storage medium readable by one or more processing circuit and storing instructions for execution by one or more processor for performing a method. The method can include, for example: receiving from a presenter local client computer device an iteratively captured screen display of the presenter local client computer device; multicasting the iteratively received captured screen display to a first virtual machine and a second virtual machine, the first virtual machine running a first provider specific web conference client application associated to a first web conference provider system, the second virtual machine running a second provider specific web conference client application associated to a second web conference provider system, and cloning by the first virtual machine and the second virtual machine the iteratively captured screen display to provide respective instances of a cloned iteratively captured screen display; sending by the first virtual machine a first instance of the cloned virtual screen display to the first web conference provider system for sharing with a first one or more viewer local client computer device connected to the first web conference provider system and participating in a web conference supported by the first web conference provider system; and sending by the second virtual machine a second instance of the cloned virtual screen display to the second web conference provider system for sharing with a second one or more viewer local client computer device connected to the second web conference provider system and participating in a web conference supported by the second web conference provider system.

In a further aspect, a system can be provided. The system can include, for example a memory. In addition, the system can include one or more processor in communication with the memory. Further, the system can include program instructions executable by the one or more processor via the memory to perform a method. The method can include, for example: receiving from a presenter local client computer device an iteratively captured screen display of the presenter local client computer device; multicasting the iteratively received captured screen display to a first virtual machine and a second virtual machine, the first virtual machine running a first provider specific web conference client application associated to a first web conference provider system, the second virtual machine running a second provider specific web conference client application associated to a second web conference provider system, and cloning by the first virtual machine and the second virtual machine the iteratively captured screen display to provide respective instances of a cloned iteratively captured screen display; sending by the first virtual machine a first instance of the cloned virtual screen display to the first web conference provider system for sharing with a first one or more viewer local client computer device connected to the first web conference provider system and participating in a web conference supported by the first web conference provider system; and sending by the second virtual machine a second instance of the cloned virtual screen display to the second web conference provider system for sharing with a second one or more viewer local client computer device connected to the second web conference provider system and participating in a web conference supported by the second web conference provider system.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 8 depicts abstraction model layers according to one embodiment.

DETAILED DESCRIPTION

Figure 1:
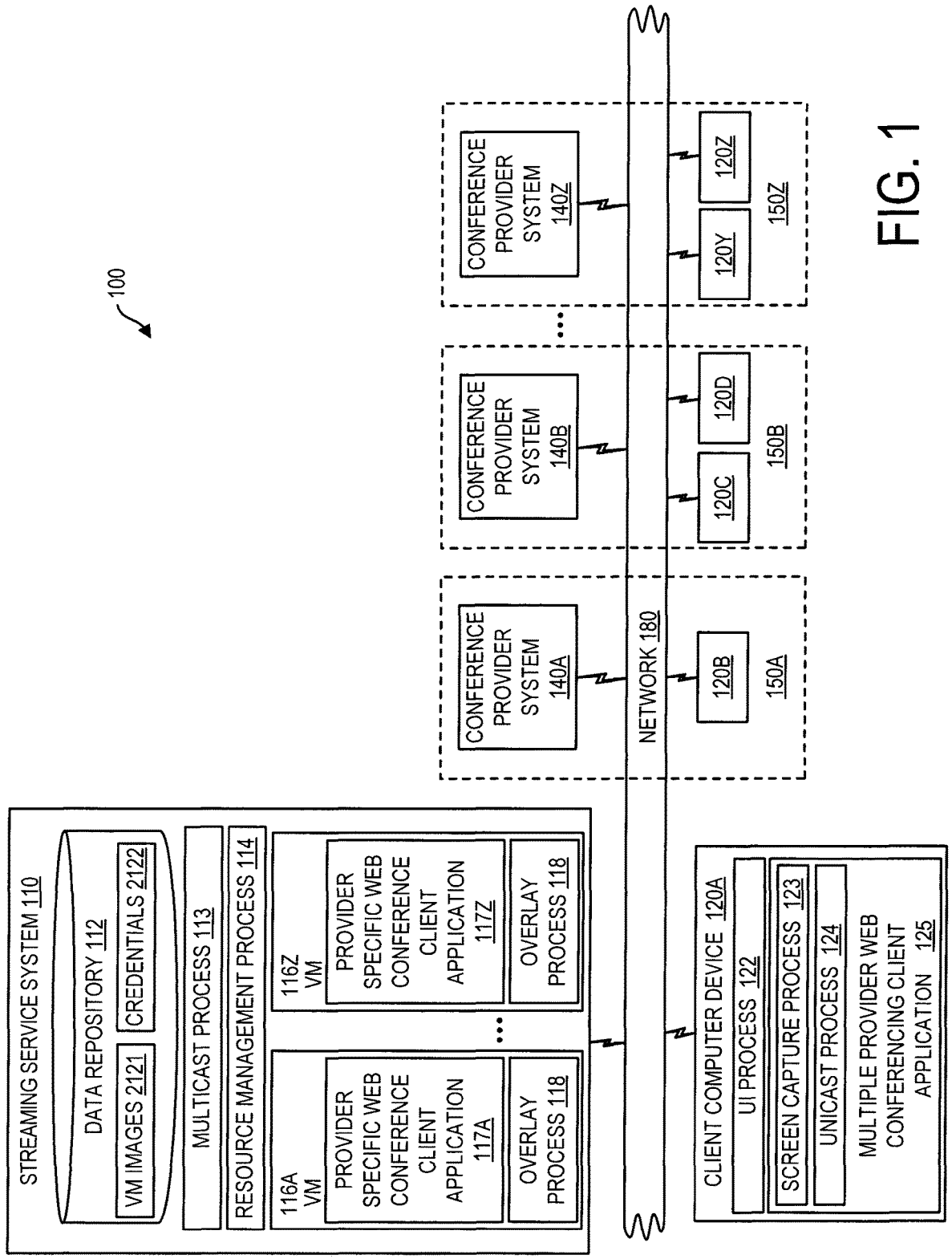
FIG. 1 is a block diagram illustrating a system having a streaming service system, a plurality of client computer devices, and a plurality of conference provider systems according to one embodiment.

System 100 for use in sharing presenter user screens is set forth in one embodiment in FIG. 1. System 100 in one embodiment can include streaming service system 110, client computer devices 120A-120Z, and conference provider systems 140A-140Z in communication with one another via network 180. System 100 in one embodiment can include streaming service system 110, client computer devices 120A-120Z, and conference provider systems 140A-140Z can be provided by computing node based devices and systems. Network 180 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

In one embodiment, streaming service system 110 client computer devices 120A-120Z, and conference provider systems 140A-140Z can be external to one another. In another embodiment, one or more of streaming service system 110 client computer devices 120A-120Z, and conference provider systems 140A-140Z can be co-located with one another. In one embodiment, streaming service system 110 can be external and remote from each of client computer devices 120A-120Z. In one embodiment, streaming service system 110 can include a plurality of computing nodes and can be defined within a datacenter. Conference providers systems 140A-140Z can be defined within one or more datacenters. Client computer devices 120A-120Z according to one embodiment can be associated to one or more local area network. According to one embodiment, each client computer device of client computer devices 120A-120Z can be associated to a different local area network.

Figure 6:
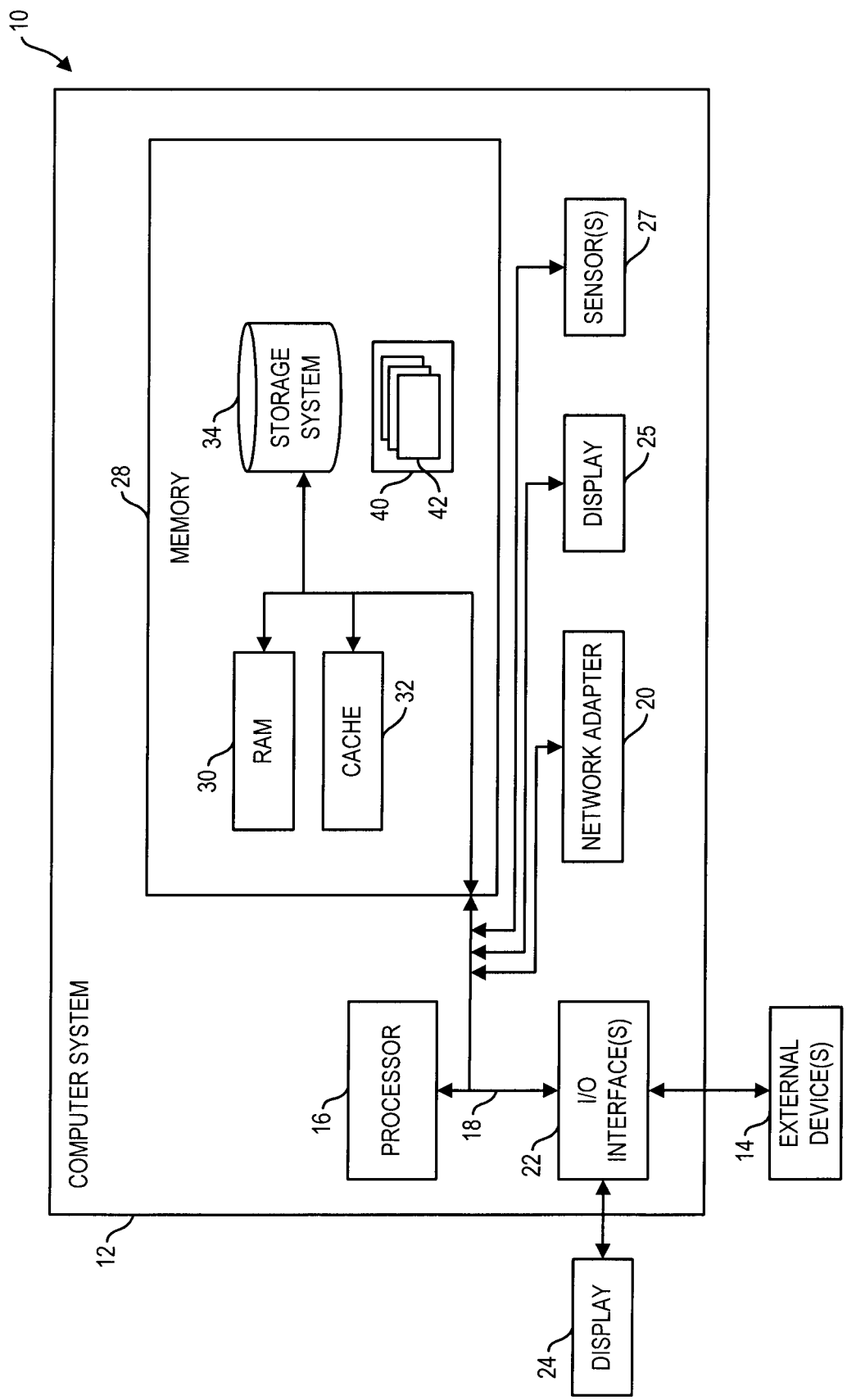
FIG. 6 depicts a computing node according to one embodiment.
Figure 7:
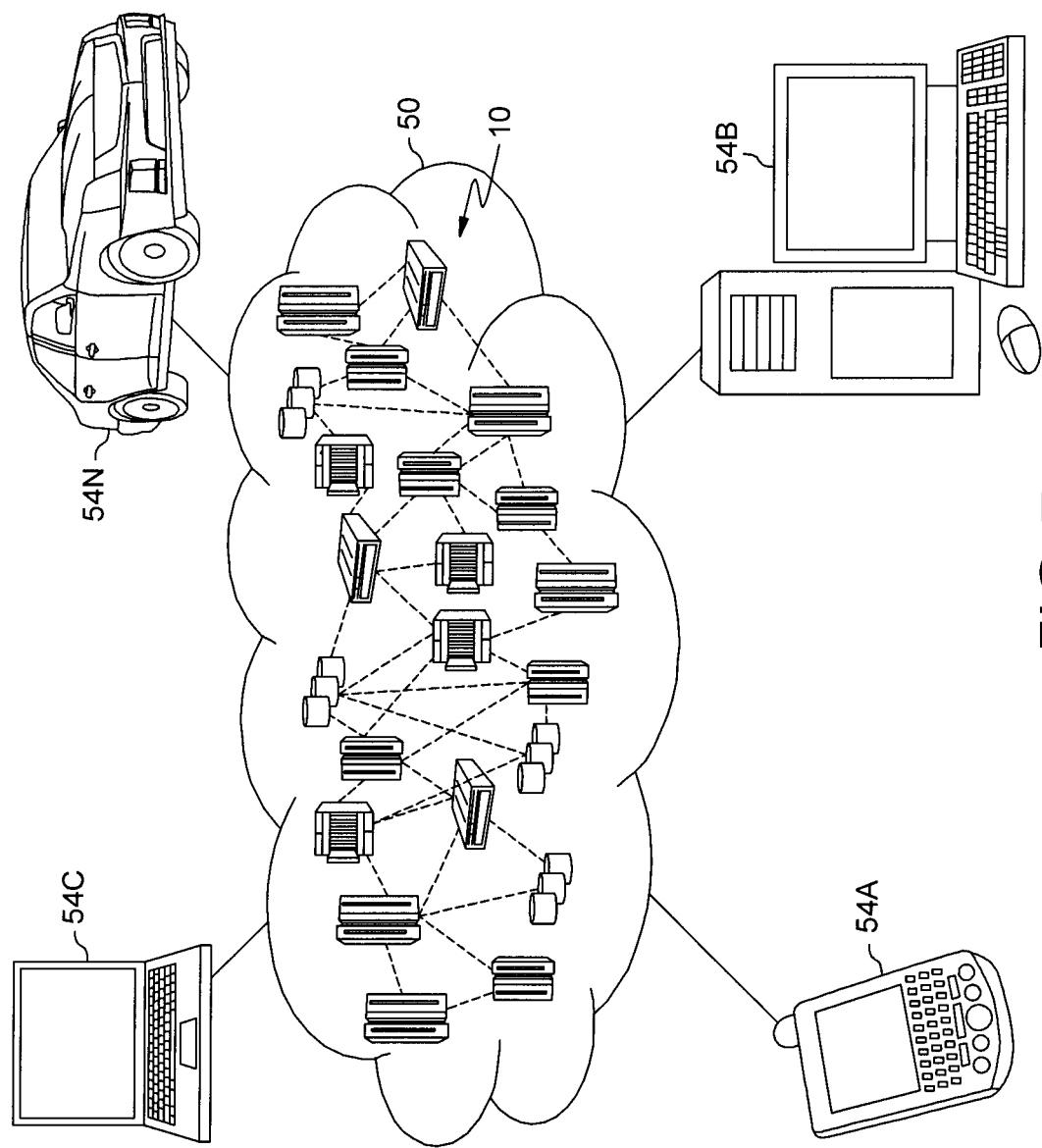
FIG. 7 depicts a cloud computing environment according to one embodiment.

According to one embodiment, streaming service system 110 can be provided by a cloud computing streaming service system having cloud computing features as set forth herein in reference to FIGS. 6-8.

Embodiments herein recognize that multiple enterprises provide multiple web conferencing services. NET-VIEWER® is a web conferencing service provided by Net Viewer AG (NET VIEWER is a registered trademark of Net Viewer AG). SKYPE® is a web conferencing service provided by Skype, Inc. (SKYPE® is a registered trademark of Skype, Inc.). IBM® SAMETIME® is a web conferencing services provided by International Business Machines Corporation (IBM® and SAMETIME® are registered trademarks of International Business Machines Corporation). Other web conferencing services include WEBEX® and IBM® SMARTCLOUD MEETINGS® (WEBEX® is a registered trademark of WebEx Communications Inc. and IBM® and SMARTCLOUD MEETINGS® are registered trademarks of International Business Machines Corporation). Numerous other providers provide web conferencing services.

Embodiments herein recognize that for a given project being performed by workers of a certain enterprise, or different enterprises, multiple web conference services may be utilized. The different web conference services can be provided by different web conference service providers. Embodiments herein recognize for example, that a user in the performance of a project may attempt to simultaneously participate in web conferences being facilitated by a first web conference provider and a second web conference provider. Embodiments herein recognize that performance degradation can occur where a local client computer device simultaneously participates in web conferences facilitated by more than one web conference provider. Embodiments herein recognize that where a single client computer device attempts to participate, a first in multiple web conferences, the client computer device can attempt to simultaneously perform screen capture requirements of each of the multiple web conferences resulting in slow down or freezing of the client computer device. Source consumption attributable to screen capture requirements and other requirements of the web conferences can consume resources exceeding the available resources available upon the client computer device.

System 100 can include features to facilitate participation of a presenter user in numerous web conferences simultaneously facilitated by numerous web conference providers. For example, web conference providers maintaining the respective conference provider systems of conference provider systems 140A-140Z as set forth in FIG. 1. In one aspect, functionalities facilitating participation in a web conference can be provided by streaming service system 110 external to client computer device 120A used by a presenter user. Streaming service system 110 can have increased computing resources relative to client computer device 120A and can more easily handle the requirements of simultaneous participation in multiple web conferences.

Streaming service system 110 can include data repository 112 for storing various data for support of operations of streaming service system 110. In VM images area 2121 data repository 112 can store VM images such as images for use in creating hypervisor based virtual machines and/or container based virtual machines. Streaming service system 110 from time to time can instantiate new VMs using images stored in VM images area 2121.

Streaming service system 110 can run multicast process 113 and resource management process 114. Streaming service system 110 running multicast process 113 can multicast captured screen displays received by streaming service system 110 from client computer device 120A to a plurality of virtual machines of allocated virtual machines 116A-116Z which can be running virtual machines. Streaming service system 110 running resource management process 114 can manage resources provided by streaming service system 110.

In one aspect streaming service system 110 running resource management process 114 can manage a pool of virtual machines (VM). Streaming service system 110 can manage a pool of virtual machines (VM) so that a pool of virtual machines includes a set of allocated running virtual machines 116A-116Z and a set of running VMs including the set of allocated running VMs and one or more additional VM. Streaming service system 110 can allocate VMs based on presenter user defined configuration data received from client computer device 120A. According to one embodiment, streaming service system 110 can allocate one VM for each web conference service that is specified for screen display sharing in configuration data received from client computer device 120A.

Figure 2:
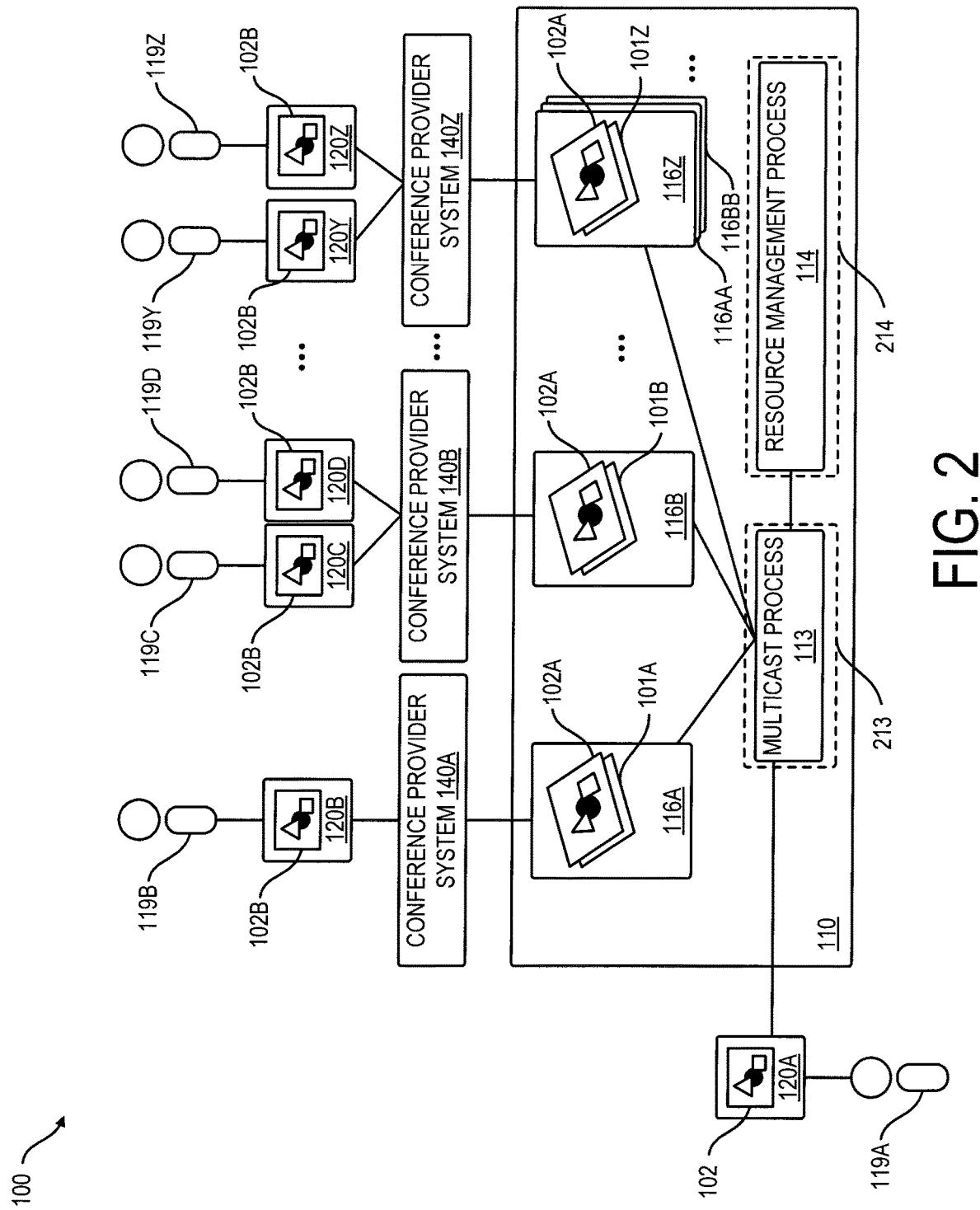
FIG. 2 is a schematic block diagram illustrating a system having a streaming service system, a plurality of client computer devices, and a plurality of conference provider systems according to one embodiment.

In one aspect streaming service system 110 running resource management process 114 can manage a pool of virtual machines (VM) so that a set of running VMs is provided to be equal to or greater than a number of allocated running VMs 116A-116Z. For example, streaming service system 110 running resource management process 114 can provide a number of running VMs, Z, to be equal to or greater than a number, N, of allocated VMs 116A-116Z. According to one embodiment streaming service system 110 running resource management process 114 can provide a number of running VMs, Z, to be equal to or greater than a number, N, of allocated VMs 116A-116Z, wherein Z=N+M and wherein M is the number of instantiated running VMs equal to or greater than the number, N, of running allocated VMs 116A-116Z. Referring to FIGS. 1 and 2, allocated running VMs can include the VMs 116A-116Z which can be allocated based on a current sharing request of a presenter user using user interface 400 (FIG. 5) and the instantiated running VMs in addition to the running allocated VMs can include the additional VMs 116AA, and 116BB and potentially additional VMs.

Streaming service system 110 can instantiate new VMs as they are needed and can decommission VMs when they are not needed. Streaming service system 110 running resource management process 114 can manage a pool of VMs so that a running VM is available at a time when a new VM is needed to satisfy a sharing request for a presenter user to alleviate a delay attributable to instantiating new runtime VMs. Where N is the number of VMs needed to satisfy a number web conference service share requests specified by a viewer user, e.g. using area 420 of user interface 400 (FIG. 5) streaming service system 110 running resource management process 114 can manage the building of VMs so that a pool of VMs always includes N+M VMs (M>=1), e.g. at least one more than the required number of VMs to avoid a VM build delay in response to a request being initiated for a new web conference service to share a screen display.

As set forth in FIGS. 1 and 2 streaming service system 110 can manage a pool of VMs comprising allocated running VMs 116A-116Z and one or more additional running VMs such as VMs 116AA and 116BB. As noted, streaming service system 110 can maintain the pool of VMs 116A-116Z and additional one or more VM so that the pool of running allocation VMs 116A-116Z and additional running one or more VM is provided to be at least one more than the required number of VMs to satisfy a current user sharing request to thereby avoid delay associated with VM instantiating to instantiate a runtime VM.

Each VM 116A can run an overlay process 118. A VM running overlay process 118 can include the VM overlaying received iteratively captured screen displays received from multicast node 113 running a multicast process 113. A VM running overlay process 118 can overlay the received iteratively captured screen display onto a VM display of the VM. For example, VM 116A running its associated overlay process 118 can overlay a received captured screen display onto a VM display 101A of VM 116A. VM 116B running its associated overlay process 118 can overlay a received captured screen display onto a VM display 101B of VM 116B. VM 116Z running its associated overlay process 118 can overlay a received captured screen display onto a VM display 101Z of VM 116Z.

Client computer device 120A can be a client computer device used by a presenter user of system 100. Client computer device 120A can run various processes for support of screen display sharing of screen displays of client computer device 120A with a plurality of simultaneously running web conferences run by different conference provider systems of conference provider systems 140A-140Z.

Client computer device 120A can run user interface (UI) process 122. Client computer device 120A running UI process 122 can include client computer device 120A displaying a manually operated user interface that permits presenter user to make various selections that are defined by presenter user defined configuration data. A presenter user using a displayed user interface can define configuration data for the selection of which provider specific web conference services out of a plurality of candidate provider specific web conference services to share screen displays with. The candidate provider specific web conference services can be candidate provider specific web conference service respectively facilitated by conference provider systems of conference provider systems 140A-140Z.

Client computer device 120A running screen capture process 123 as part of running multiple provider web conference application 125 can capture screen displays with display of client computer device 120A. Client computer device 120A running screen capture process 123 can capture screen displays of client computer device 120A for sharing with selected web conferences. Client computer device 120A running screen capture process 123 can iteratively capture screen display of a display of client computer device 120A. The capturing of screen displays can be at iterative intervals, e.g. predetermined intervals, e.g. a configurable and/or predetermined interval. Screen displays can be captured at a configurable screen display capture rate, e.g. at a rate of from about 1 to about 120 or more screen display captures per second. Client computer device 120A running unicast process 124 can iteratively unicast iteratively captured screen displays captured using screen capture process 123. Client computer device 120A running unicast process 124 can unicast iteratively captured screen displays to streaming service system 110 for receipt by a multicast node 213 of streaming service system 110, which multicast node 213 can run multicast process 113 to multicast the iteratively captured screen displays to a plurality of allocated VMs 116A-116Z of streaming service system 110.

Resource management node 214 running resource management process 114 can allocate N running VMs 116A-116Z to define a set of allocated VMs based on web conference service selection data included in presenter user defined configuration data defined by a presenter user of client computer device 120A and received from client computer device by streaming service system 110. The web service selection data can specify which of a plurality of web services to share screen displays of client computer device 120A with. Resource management node 214 can be provided e.g. by a virtual machine (VM) or a computing node 10 provided by a physical computing node. In one embodiment a computing node 10 provided by a single physical computing node can commonly host VMs that define node 213, node 214 allocated running VMs 116A-116Z and remaining VMs 116AA, 116B defining a pool of running VMs equal to or greater than a number of currently allocated VMs.

Screen capture process 123 and unicast process 124 can be provided as part of a multiple provider web conference client application 125 running on client computer device 120A. Multiple provider web conference client application 125 running on client computer device 120A can facilitate the sharing of iteratively captured screen displays of client computer device 120A with multiple different web conference services provided by different web conference service providers. The multiple different web conference service providers can operate respectively the different ones of the conference provider systems 140A-140Z depicted in FIGS. 1 and 2.

Referring to FIG. 1, client computer device 120B can be joined to a web conference being facilitated by conference provider system 140A. Client computer devices 120C and 120D can be joined to web conference being facilitated by conference provider system 140B. Client computer devices 120Y and 120Z can be joined to a web conference being facilitated by conference provider system 140Z. Using features with reference to client computer device 120A and streaming service system 110, presenter user using client computer device 120A can simultaneously share screen displays, displayed on a display of client computer device 120A, with client computer device 120B joined to a first web conference, client computer devices 120C and 120D joined to a second web conference, as well as client computer devices 120Y and 120Z joined to a third web conference.

Conference provider systems 140A-140Z can support and facilitate web conferences between sending and receiving client applications running on VMs 116A-116Z and associated respective conference provider systems 140A-140Z with use of various web conferencing protocols including the Binary Floor Control Protocol (BFCP) as set forth in Request for Comments (RFC) 4582.

Within a conference, some applications may manage the access to a set of shared resources, such as the right to send media to a particular media session. Floor control enables such applications to provide users with coordinated (shared or exclusive) access to these resources. The Requirements for Floor Control Protocol list a set of requirements that need to be met by floor control protocols. The Binary Floor Control Protocol (BFCP) meets these requirements. BFCP has been designed so that it can be used in low-bandwidth environments. The binary encoding used by BFCP achieves a small message size (when message signatures are not used) that keeps the time it takes to transmit delay-sensitive BFCP messages to a minimum. Delay-sensitive BFCP messages include FloorRequest, FloorRelease, FloorRequestStatus, and ChairAction. Conference provider systems 140A-140Z can use various other communication protocols such as the Real-time Transport Protocol (RTP) and the RTP Control Protocol (RTCP) set forth in Request for Comments (RFC) 3550.

FIG. 2 is a functional schematic view of system 100 as depicted in FIG. 1. A presenter user 119A can share screen displays with viewer users 119B, 119C, 119D, 119Y, and 119Z who are using respectively client computer devices 120B, 120C, 120D, 120Y, and 120Z. Client computer device 120A can be running screen capture process 123 and unicast process 124 (FIG. 1) as part of multiple provider web conference application 125 so that captured screen displays of client computer device 120A are iteratively unicast to multicast node 213 of streaming service system 110 running multicast process 113. Multicast node 213 running multicast process 113 in turn can multicast the received iteratively captured screen displays received from client computer device 120A, respective VM 116A, 116B, and 116Z as shown in FIG. 2. Multicast node 213 can be provided e.g. by a virtual machine or a computing node 10 provided by a physical computing node.

VMs 116A, 116B, and 116Z can have respective VM displays 101A, 101B, and 101Z. In response to receiving multicast iteratively captured screen displays from multicast process 113 and multicast node 213, respective VMs 116A, 116B, and 116Z can overlay screen display overlays 102A on respective VM displays 101A, 101B, and 101Z. VMs 116A, 116B, and 116Z can perform cloning of iteratively captured screen displays received from multicast node 213 performing multicast process 113 including by overlaying screen display overlays 102A on respective VM displays 101A, 101B, and 101Z.

Resource management process 114 according to one embodiment can allocate one VM for each web conference service of a set of candidate web conference services for which for which there has been specified a selection of sharing of screen displays. Web conference service selections can be specified using e.g. area 420 of user interface 400 as set forth in FIG. 5. Resource manager manger process 114 can maintain a pool of running VMs so that a number of running VMs is equal to or greater than the number, N, of allocated VMs, wherein streaming service system 110 can allocate a set of N allocated VMs to be equal to a number of selected web conference services selected for sharing of screen displays. According to one embodiment streaming service system 110 can allocate one VM of allocated running VMs 116A-116Z for each candidate provider web conference service selected for sharing.

Respective allocated running VMs 116A-116Z can share their respective overlay screen displays 102A with their associated conference provider systems. With reference to the embodiment described with reference to FIGS. 1 and 2, streaming service system 110 can provide VM 116A to be associated with conference provider system 140A, streaming service system 110 can provide VM 116B to be associated with conference provider system 140B, and streaming service system 110 can provider VM 116Z to be associated with conference provider system 140Z.

Conference provider systems 140A, 140B, and 140Z can be providing and supporting web conference services to various users. Conference provider system 140A can be providing web conference services to viewer user 119B associated to client computer device 120B. Conference provider system 140B can be providing web conference services to viewer users 119C and 119D associated to client computer devices 120C and 120D respectively. Conference provider system 140Z can be providing web conference services to viewer users 119Y and 119Z associated to client computer devices 120Y and 120Z respectively. In response to receiving an overlay display from its respective VM, conference provider systems 140A, 140B, and 140Z can share the received overlay screen display received from an associated VM with associated client computer devices associated to the respective conference provider systems 140A, 140B, and 140Z. Conference provider system 140A can share received overlay screen display 102A received from VM 116A with client computer device 120B. Conference provider system 140B can share received overlay screen display 102A received from VM 116B to its associated client computer devices 120C and 120D. Conference provider system 140Z can share received overlay screen display 102A received from VM 116Z to client computer device 120Y. In response to receipt of an overlay screen display from an associated conference provider system, each client computer device of client computer devices 120B-120Z can display a reproduced screen display 102B. Referring to FIG. 2 each client computer device 120B, 120C, 120D, 120Y, and 120Z can display a reproduced screen display 102B having content of overlay screen display 102A and screen display 102 provided by a shared screen display displayed on presenter client computer device 120A.

There is set forth herein a method to multicast a web-conferencing shared screen session to different web conferencing services, e.g., NETVIEWER®, SKYPE®, IBM® SAMETIME®, WEBEX®, IBM® SMARTCLOUD MEETINGS® or web conferencing services provided by numerous other web conference providers.

Embodiments herein recognize that as the audience for web conference based virtual meetings and webinars grows, there also grows the variety of clients, with different client computer devices having different preferences for web conference client applications. For example, a first set of one or more collaborators may prefer web conference services X facilitated by a first conference provider system and a second set of one or more collaborator may prefer web conference services Y facilitated by a first conference provider system.

Embodiments herein can include streaming service system 110 facilitating the sharing of a screen session of a local presenter client computer device 120A to different web conferencing systems supported by different conference provider systems 140A-140Z, giving flexibility to users of client computer device 120A-120Z to choose their favorite tool to join the webinar. Embodiments herein can be provided so that a presenter user of presenter client computer device 120A no longer needs to choose one tool for participating in a web conference, but can deliver screen display content via multiple web conference service providers, being able to reach a larger audience, with the best quality and availability possible. Embodiments herein can include features so that it will not be required for an audience to use the same conferencing system provider in order to join a web conference. Methods herein can avoid common environment problems (operating system compatibility, license requirement, etc.) when establishing a web conference among multiple attendees.

Embodiments herein can reduce or eliminate technical problems occurring during a web conference based webinar or virtual meeting, as the clients can choose the best tool to join the conference. Embodiments herein can provide increased availability and capacity of web conference services accessible from a client computer device. For example, it has been observed that in many cases web-conference tools reach a maximum capacity of users connected, limiting the audience. Embodiments herein recognize that in other scenarios a particular tool may present availability issues, so the users still have other options to join the conference. Embodiments herein can eliminate device compatibility issues. For example, embodiments herein recognize that client computer devices running a LINUX® OS sometimes have difficulties join web conferences supported by tools designed to run on client computer devices running a WINDOWS® OS or MACINTOSH® OS.

Embodiments herein can combine multiple technologies, including e.g. streaming, cloud computing and web conferencing to address problems faced by presenters during web conferencing sessions. Embodiments herein can allow presenters to reach a broader audience, reduce technical difficulties and increase availability of a single platform by multicasting a web conference shared screen session through different providers. To the audience comprising web conference viewers, embodiment herein provide the ability to choose their favorite provider specific web conference client application which may be a client application which features improved performance on the user's device.

Embodiments herein can employ a multiple web conference provider client application 125 on a presenter's machine provided by client computer device 120A to relay a local screen of the client computer device 120A provided by a shared screen display 102 to a streaming service provided by streaming service system 110 capable of creating a group of relay servers provided by virtual machines 116-116Z connected to different conference provider systems 140A-140Z. The relays provided by VMs 116A-116Z can be cloud based resources pooled and created on demand. Each relay server provided by a VM 116A-116Z can be capable of receiving a video stream defining an overlay screen display 102A that overlays the VMs real screen 101A-101Z, and at the same time can connect to the target provider conference provider system 140A-140Z using an official client provided by a provider specific web conference client application 117A-117Z running on each respective VM 116A-116Z. Viewer users using client computer devices 120B-120Z which can run provide specific web conference client applications can view the presenter's shared screen using the standard vendor conference client provided by the provider specific web conference client application running on the respective client computer devices 120B-120Z.

In accordance with aspects provided herein client computer devices 120B-120Z servicing as viewer client computer devices can participate in web conferences in which screen display 102 is shared globally across multiple web conference platforms, and can view such content with use of respective installed provider specific web conference client applications running respectively thereon and can be absent of any specialized software in addition to such respective provider specific web conference client applications.

Streaming service system 110 can receive a video stream defined by iteratively captured screen displays from the presenter captured by screen capture process 123 running as part of multiple provider web conference client application 125 and can clone the signal provided by the video stream to multiple relay servers which can be provided by VMs 116A-116Z. Streaming service system 110 can automatically activate running of a proper provider specific web conference client application running on each VM of the allocated VMs 116A-116Z and can connect to the correct conference session being facilitated by a select one conference provider system of conference provider systems 140A-140Z in accordance with web conference service selection data included with presenter user defined configuration data received by streaming service system 110.

A method 300 for performance by streaming service system 110 according to one embodiment is set forth with reference to the flowchart of FIG. 3.

At block 310 streaming service system 110 can perform receiving from a presenter local client computer device an iteratively captured screen display of the presenter local client computer device. At block 320 streaming service system 110 can perform multicasting the iteratively received captured screen display to a first virtual machine and a second virtual machine, the first virtual machine running a first provider specific web conference client application associated to a first web conference provider system, the second virtual machine running a second provider specific web conference client application associated to a second web conference provider system, and cloning by the first virtual machine and the second virtual machine the iteratively captured screen display to provide respective instances of a cloned iteratively captured screen display. At block 330 streaming service system 110 can perform sending by the first virtual machine a first instance of the cloned virtual screen display to the first web conference provider system for sharing with a first one or more viewer local client computer device connected to the first web conference provider system and participating in a web conference supported by the first web conference provider system. At block 340 streaming service system 110 can perform sending by the second virtual machine a second instance of the cloned virtual screen display to the second web conference provider system for sharing with a second one or more viewer local client computer device connected to the second web conference provider system and participating in a web conference supported by the second web conference provider system.

Figure 3:
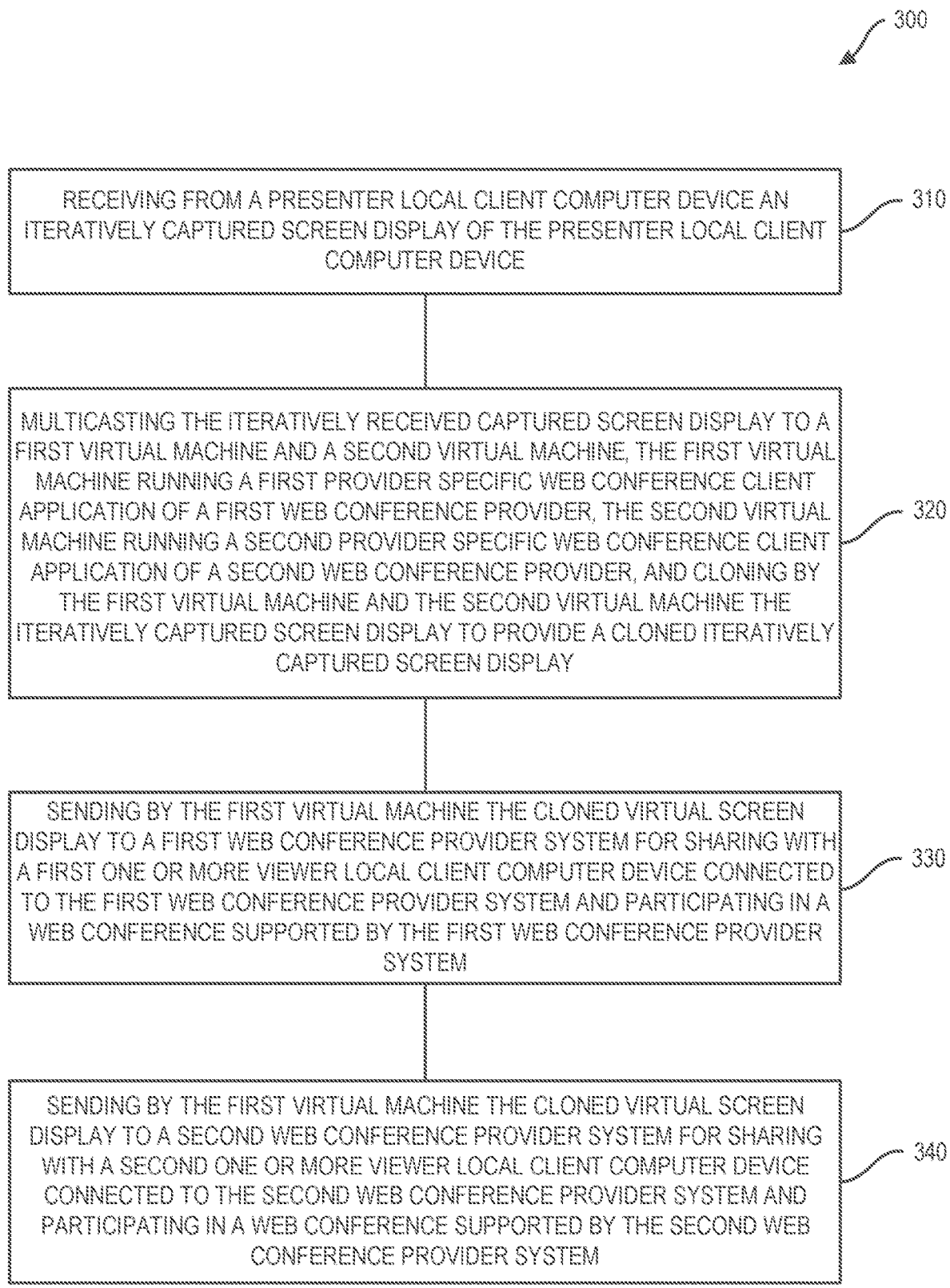
FIG. 3 is a flowchart illustrating a method that can be performed by a streaming service system according to one embodiment.
Figure 4:
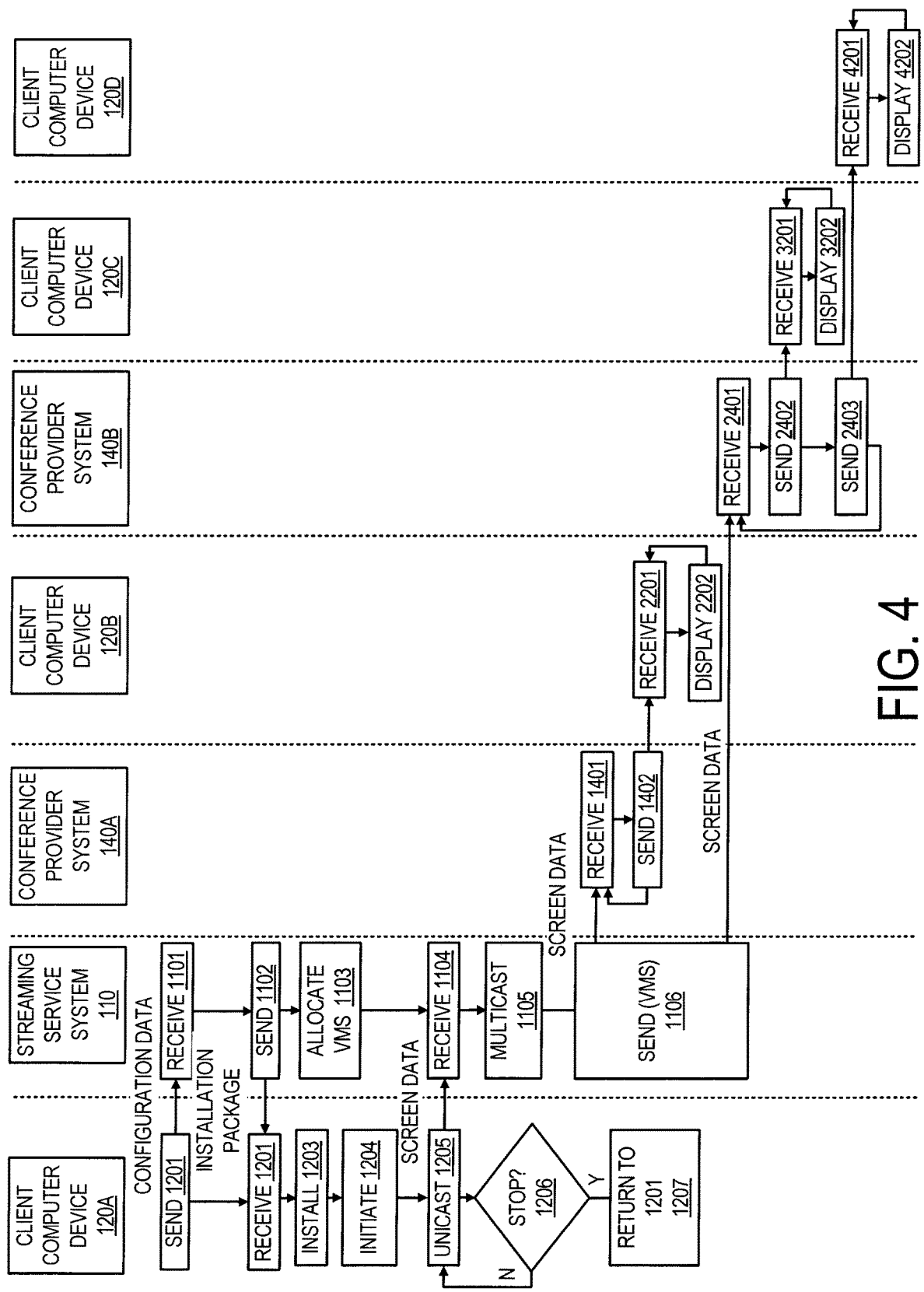
FIG. 4 is a flowchart illustrating a method that can be performed by streaming service system interoperating with a plurality of client computer devices and a plurality of conference provider systems according to one embodiment.

A particular example of streaming service system 110 performing method 300 as set forth in reference to FIG. 3 is described with reference to the flowchart of FIG. 4 illustrating streaming service system 110 interoperating with client computer device 120A, conference provider system 140A, client computer device 120B, conference provider system 140B, client computer device 120C, and client computer device 120D.

Referring to the flowchart of FIG. 4, client computer device 120A at block 1201 can send configuration data to streaming service system 110 for receipt by streaming service system 110 at block 1101. Configuration data sent at block 1201 can include user defined configuration data. User defined configuration can be defined using a user interface 400 as set forth in FIG. 5. User interface 400 can include registration area 410 allowing a user to register with one or a plurality of web conference services.

Using area 410 a user can register for the multiple web conference services facilitated by streaming services system 110. During registration, a presenter user can enter into user interface 400 at area 410 credentials (e.g. username and/or password) which credentials can be stored in credentials area 2122 of data repository 112. Using area 410 a user can also register with a plurality of web conference provider services each having a different set of credentials. During registration, a presenter user can enter into user interface 400 at area 410 credentials (e.g. username and/or password) which credentials can be stored in credentials area 2122 of data repository. System 100 can later use the credentials stored in credentials area 2122 established using area 410. For example, VMs 116A-116Z as set forth in FIG. 2 can use credentials stored in credentials area 2122 established using area 410 for each of several web conference provider services so that respective conference provider client applications can be downloaded into respective allocated running VMs 116A-116Z from respective conference provider systems of conference provider systems 140A-140Z associated to respective ones of the allocated running VMs 116A-116Z.

Using selection area 420 the user can select web conference services to share screen displays with and based on selections made using area 420, system 100 can share a screen display of client computer device 120A to selected conference provider systems of conference provide systems 140A-140Z specified by the selections made using area 420. For each different provider specific web conference service specified using area 420, client computer device 120A can share a screen display with the selected web conference service. Specifically, as set forth herein for each different web conference service selected using area 420, streaming service system 110 can allocate a different allocated running VM 116A-116Z.

Streaming service system 110 for each allocated running VM 116A-116Z can run a web conference client application (e.g. application 117A for VM 116A, application 117Z for VM 116Z as shown in FIG. 2) so that the VM emulates a presenter local client in a provider supported web conference having client computer devices provided as viewer client computer devices such as client computer devices 120B-120Z (client computer device 120B for conference provider system 140A, client computer devices 120C and 120D for conference provider system 140A, and client computer devices 120Y and 120Z for conference provider system 140Z).

In area 430 of user interface 400 a presenter user of client computer device 120A can define content for sharing with multiple different client computer devices such as client computer devices 120B-120Z participating in different web conferences facilitated by different provider specific conference provider systems 140A-140Z.

In area 430 of user interface 400 a presenter user of client computer device 120A can specify starting or stopping of a web conference session in which content of iteratively captured screen displays are shared from client computer device 120A provided as a presenter client computer devices with multiple other client computer devices 120B-120Z configured as viewer client computer devices, which client computer devices 120B-120Z are participating in different web conferenced being supported by a set of different provider specific conference provider systems 140A-140Z.

In response to receipt of configuration data at block 1101, streaming service system 110 can proceed to block 1102. At block 1102 streaming service system 110 in the case that a multiple web conference client application has not previously been installed on client computer device 120A, can send to client computer device 120A an installation package for receipt by client computer device 120A at block 1201. The installation package sent at block 1101 can include, e.g. libraries and executable files for support of multiple web conference client application processes as set forth herein, e.g. screen capture process 123 and unicast process 124 as described in connection with FIG. 1. In response to receipt of the installation package at block 1201, client computer device 120A can install the received installation package at block 1203.

Returning again to functions of streaming service system 110, streaming service system 110 at block 1103 can allocate running VMs based on user defined configuration data received at block 1101. Streaming service system 110 at block 1103 can activate resource management process 114 to allocate a number of running VMs so that one running VM is allocated for each web conference service selected using area 420 of user interface 400. Streaming service system 110 at block 1103 can be maintaining a pool of running VMs, so that a number of total running VMs is maintained at a number equal to or greater than a number of allocated running VMs.

Streaming service system 110 can be operative for example, so that where VMs 116A-116Z are allocated to satisfy sharing designations designated by a user using area 420 of user interface 400, streaming service system 110 maintains a pool of running VMs to include VMs 116A-116Z plus one or more additional VM, e.g. VM 116AA, VM 116BB as indicated in FIG. 2. By maintaining a pool of running VMs equal to or greater than a number of allocated VMs allocated to satisfy sharing requests of a user, streaming service system 110 can alleviate VM instantiation delays associated with new sharing requests specified by a user using user interface 400 to specify sharing of a local screen display with additional running web conferences that are facilitated and supported by different conference provider systems 140A-140Z.

For providing a pool of running VMs, e.g. allocated running VMs 116A-116Z plus one or more additional running VM, streaming service system 110 can be operative to automatically instantiate a new VM responsively to difference count between total running VMs and allocated running VMs falling below a threshold. In one embodiment the threshold can be the integer value 1. In another embodiment, the threshold can be another integer, e.g. M=2, M=3, or M>3, wherein M is the difference count between total number of running VMs and a number of allocated running VMs. For instantiation of new runtime running VMs, streaming service system 110 can use VM instantiation images stored in VM images area 2121 of data repository 112 of streaming service system 110. In one embodiment VMs 116A-116ZZ can be hypervisor based VMs. In one embodiment VMs 116A-116ZZ can be container based VMs.

Referring to user interface 400 (FIG. 5) system 100 can be configured according to one embodiment so that on the entry of data into registration area 410 being sensed (which can be prior to block 1201) streaming service system 110 can automatically instantiate first, second and third running VMs (anticipating that at least two provider specific web conference service sharing selections will be made) so that the first and second VMs will be running if they are allocated by streaming service system 110 in response to configuration data being received at block 1101 that specifies sharing with first and second provider specific web conference services. System 100 can be configured according to one embodiment so that on the entry of data into selection area 420 being sensed (which can be prior to block 1201) indicating a provisional selection of a third web conference service designated for sharing streaming service system 110 can automatically instantiate a fourth running VM. System 100 can be configured according to one embodiment so that on the entry of data into selection area 420 being sensed (which can be prior to block 1201) indicating a provisional selection of a fourth web conference service designated for sharing streaming service system 110 can automatically instantiate a fifth running VM and so on.

Streaming service system 110 according to one embodiment can be configured to assure that at a time a start selection is made using area 440 to initiate sending of configuration data at block 1201 to initiate a multiple platform screen display sharing session, streaming service system 110 is running at least the number of VMs to be allocated based on the configuration data defined using area 420. Streaming service system 110 according to one embodiment can be configured to assure that at a time a start selection is made using area 440 to initiate sending of configuration data at block 1201 to initiate a multiple platform screen display sharing session, streaming service system 110 is running a number of VMs equal to or greater than the number of VMs to be allocated based on the configuration data defined using area 420.

In one embodiment, streaming service system 110 can be configured to maintain a number of running virtual machines of the streaming service system 110 equal to or greater than a number of virtual machines of the allocated set of virtual machines for avoidance of virtual machine instantiation delay in response to an initiation of a screen display sharing session. In one embodiment, the streaming service system 110 for maintaining the number of running virtual machines of the streaming services system 110 equal to or greater than a number of virtual machines of the allocated set of virtual machines examines a current capacity utilization level of running virtual machines of the streaming service system 110, decommissions one or more running virtual machine based on a determination that the current capacity utilization level is below a low threshold, and instantiates one or more new running virtual machine based on a determination that the current capacity utilization level exceeds a high threshold. In one embodiment, the low threshold can be a certain percentage capacity utilization level selected to be at a certain percentage level of between e.g., 50 percent and 80 percent. In one embodiment, the low threshold can be a certain percentage capacity utilization level selected to be at a certain percentage level of between e.g., 80 percent and 95 percent. The percentage can be based on environmental factors, e.g., including such factors as the total number of VMs deployed. The control described conserves resources consumed by instantiation while avoiding instantiation delays occurring in response to configuration data being sent at block 1201.

Figure 5:
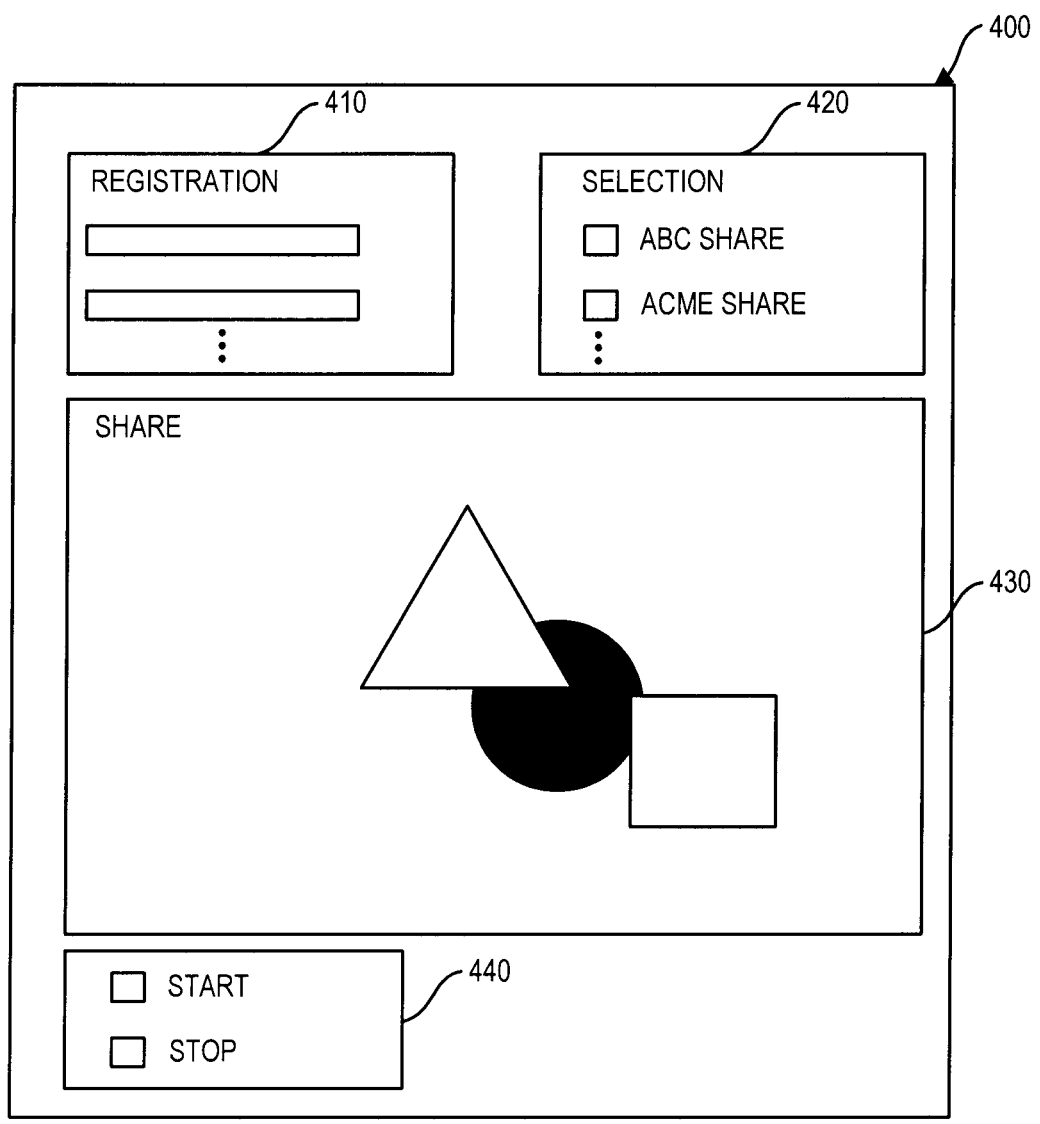
FIG. 5 depicts a client user interface according to one embodiment.

Streaming service system 110 can provide services to a plurality of presenter users simultaneously. In such an embodiment, streaming service system 110 running resource management process 114 can manage a pool of running VMs so that the pool of running VMs are shared by multiple presenter users simultaneously. For example, a first presenter user can stop a sharing session that uses a first VM and in response to stopping by the first presenter user streaming service system 110 can de-allocate the first VM and register the running VM into a set of available running VMs within the pool of VMs. A second presenter user can then select a new web conference provider service for sharing, e.g. using area 420 of user interface (FIG. 5). In response to such selection streaming service system 110 can allocate the first VM to the second presenter user for support of the second presenter user's request to share screen displays with the new web conference provider service.

Allocated VMs allocated at block 1103 by streaming service system 110 can run certain processes in response to being allocated. At block 1103, each allocated VM 116A-116Z can run a provider specific web conference client application. Running of a provider specific web conferencing application facilitates a VM of streaming service system 110 emulating the operation of a local client computer device participating in a provider (enterprise) specific web conference. Referring to FIG. 2, VM 116A can run a provider specific web conference client application 117A (FIG. 1) that facilitates VM 116A emulating the operation of a local client computer device participating in a web conference (depicted by web conference network 150A) facilitated and supported by conference provider system 140A. VM 116B can run provider specific web conference client application 117B (indicated but not shown in FIG. 1) that facilitates VM 116B emulating the operation of a local client computer device participating in a web conference (depicted by web conference network 150B) facilitated and supported by conference provider system 140B. VM 116Z can run provider specific web conference client application 117Z that facilitates VM 116Z emulating the operation of a local client computer device participating in a web conference (depicted by web conference network 150Z) facilitated and supported by conference provider system 140Z. Streaming service system 110 according to one embodiment can restrict the number of provider specific web conference client applications running on each allocated running VM 116A-116Z so that no more than one provider specific web conference client application is open running on each allocated running VM 116A-116Z at a given time. Accordingly, the bandwidth and client resource consumption problems described herein associated with opening and running multiple provider specific web conference client applications simultaneously can be avoided.

In one embodiment VM images area 2121 of data repository 112 can be configured so that when new VMs are instantiated, the new VMs have preinstalled thereon a plurality of provider specific web conference client applications. Streaming service system 110 can be configured to run one of the plurality of preinstalled client applications depending on which provider specific web conference provider system the current VM is being allocated for. On the running of the particular provider specific web conference client application, the VM can populate the user credentials received with the configuration data received by streaming service system 110 at block 1101. In another embodiment, each virtual machine allocated at block 1103 can install an appropriate provider specific web conference client application on the fly (i.e. without the application being present on VM instantiation) based on the particular conference provider system associated to the VM. In such an embodiment, a data exchange can occur responsively to configuration data being received at block 1101 between an allocated VM allocated at block 1103 and the conference provider system associated to the newly allocated VM to install on the newly allocated VM a provider specific web conference client application associated to the conference provider system. Credentials received with the configuration data received at block 1101 can be used to facilitate such provider specific web conference client application.

Returning to operations of client computer device 120A, client computer device 120A at block 1204 can initiate unicasting the screen displays of client computer device 120A in response to the sending of presenter user configuration data being sent at block 1201. As indicated by the loop depicted at blocks 1205 and 1206, client computer device 120A can be iteratively unicasting the screen displays defined by a presenter user using client computer device 120A. The iterative unicasting screen displays can continue until a stop position is determined at block 1206. A stop condition can be achieved for example when a user activates a stop control using area 440 of user interface 400 (FIG. 5). On the observation of the stop condition, client computer device 120A can at block 1207 return to block 1201 to facilitate a presenter user defining new configuration data for a new screen sharing session in which a screen display can be shared with different viewer users using different web conferences facilitated by different enterprise web conference provider systems 140A-140Z. In some embodiments system 100 can be configured so that with use of user interface 400 a presenter user can stop sharing screen displays with some conference provider systems while continuing to share screen displays with other conference provider systems.

Streaming service system 110 at block 1104 can be iteratively receiving iteratively captured screen displays iteratively unicast by client computer device 120A and received by multicast node 213 of streaming service system 110.

Receiving of iteratively unicast screen displays at block 1104 by streaming service system 110 can be performed by multicast node 213 of streaming service system 110 running multicast process 113. In response to receiving iteratively unicast screen displays at block 1104, streaming service system 110 by multicast node 213 at block 1105 can multicast received iteratively captured screen displays to a plurality of VMs; namely, the running VMs allocated at block 1103 by streaming service system 110. The respective allocated running VMs 116A-116Z receiving the multicast screen displays can be running overlay process 118 to responsively, on receipt of the multicast screen displays, overlay the received multicast screen displays onto an underlying VM display associated with the VM.

Each allocated running VM 116A-116Z can be configured to share overlay screen display 102A to its associated conference provider system of conference provider systems 140A-140Z as a shared screen display.

Referring to FIG. 2, the shared screen displays shared to each respective conference provider system 140A-140Z can be shared by the respective conference provider systems 140A-140Z to certain of client computer devices 120B-120Z associated to the respective conference provider systems 140A-140Z.

Conference provider system 140A associated to allocated running VM 116A can iteratively share an iteratively received overlay screen display 102A received from allocated running VM 116A to client computer device 120B associated to conference provider system 140A, operated by a first provider specific web conference service provider.

Conference provider system 140B associated to allocated running VM 116B can iteratively share an iteratively received overlay screen display 102A received from allocated running VM 116B to client computer devices 120C and 120D associated to conference provider system 140B, operated by a second provider specific web conference service provider.

Conference provider system 140B associated to allocated running VM 116Z can iteratively share an iteratively received overlay screen display 102A received from allocated miming VM 116Z to client computer devices 120Y and 120Z associated to conference provider system 140Z, operated by a third provider specific web conference service provider.

According to one embodiment, streaming service system 110, by allocated running VMs 116A-116Z at block 1106, can share overlay screen displays to their associated conference provider systems of conference provider systems 140A-140Z, which in turn can share the received overly screen displays with their associated client computer devices of client computer devices 120B-120Z provided as viewing client computer devices.

At block 1106, streaming service system 110 by VM 116A associated to conference provider system 140A can share an overlay screen display multicast thereto with conference provider system 140A associated to VM 116A, which shared overlay screen display 102A can be received at block 1401. Responsively to the received overlay screen display at block 1401, conference provider system 140A can send the overlay screen display to viewer client computer device 120B at block 1102 for receipt by client computer device 120B. Responsively to the receipt of the overlay screen display at block 2201, client computer device 120B at block 2202 can display on a display of client computer device 120B a reproduced screen display 102B having the content of overlay screen display 102A and shared screen display 102. Simultaneously with the sending of an overlay screen display for receipt by conference provider system 140A, streaming service system 110 by VM 116B at block 1102 can be sending an overlay screen display to conference provider system 140B associated to VM 116B for receipt by conference provider system 140B at block 2401. In response to receiving the overlay screen display at block 2401, conference provider system 140B at block 2402 and 2403 respectively, simultaneously with the sending at block 1402 can send the overlay screen display to client computer device 120C and client computer device 120D respectively, at blocks 2402 and 2403 respectively. Client computer device 120C on receipt of the sent overlay screen display at block 3201 can display a reproduced screen display 102B at block 3202 having content of the received overlay screen display 102A and shared screen display 102. Client computer device 120D on receipt of the sent overlay screen display received at block 4201, can display a reproduced screen display 102B at block 4202 having content of the received overlay screen display received at block 4201 and the shared screen display 102 originally unicast from client computer device 120A at block 1205.

As depicted by the loops defined by blocks 1401 and 1402, blocks 2201 and 2202, blocks 2402 and 2403, blocks 3201 and 3202, and blocks 4201 and 4202 the display of reproduced screen displays 102B having content of the overlay screen displays 102A and the shared screen display 102 unicast at block 1205 can be iterative, ongoing, until the iterative display is stopped at block 1206 by client computer device 120A in response to stop condition configuration data being defined by a presenter user using user interface 400 of client computer device 120A, e.g. using area 440 of user interface 400 of FIG. 5.

Certain embodiments herein may offer various technical computing advantages for improving the operation of computer systems and computer networks. Embodiments herein can avoid computer resource slowdown or freezing resulting from a local presenter client computer device attempting participation in multiple web conferences simultaneously. Embodiments herein can include use of a multiple enterprise web conference client application that facilitates the sharing of a screen display onto multiple web conference platforms simultaneously with a multiple enterprise web conference, client application running on a presenter client computer device the client computer device can iteratively unicast a shared screen display to the streaming service system. Where the iteratively unicast screen display can be received by a multicast node. A multicast node running a multicast process can multicast iteratively received screen displays to each of a plurality of virtual machines (VMs) which can be allocated on a one-to-one basis in relation to enterprise web conference systems designated for sharing of screen displays. Allocated screen displays in turn can share received allocated VMs of a streaming service system in response to receiving multicast screen displays can generate overlay screen displays for overlaying on the respective real screen displays. The VMs can share the respective overlay screen displays with their associated conference provider systems. Each conference provider system being operated by different enterprise web conference provider. Each of the allocated VMs of the streaming service system can include a provider specific web conference client application facilitating the emulation of a provider specific local client computer device by a VM. Conference provider systems on receipt of shared overlay screen displays can responsively share the received overlay screen displays with respective viewer client computer devices associated thereto, and in response to the receipt of shared overlay screen displays by the respective viewer client computer devices which can display reproduced screen displays 102B having the content of the received overlay screen displays and of the originally iteratively unicast shared screen display shared by the presenter client computer device.

According to one embodiment, a screen sharing via cloud method can include sharing video streaming to multiple platforms like WEBEX and SKYPE utilizing a single client/portal. The video presenter can connect in any streaming platform and guests can join in any other platform available to participate of the event, discarding the technical requirement to have everyone using the same streaming platform. Embodiments herein recognize that existing screen sharing solutions lack features needed to access video streaming from different platforms or devices. With existing technologies video presenter and viewer participants need to connect through same software to see the presenting and embodiment herein recognize that this is an obstacle due to different technical requirements for each platform. The participants must have all prerequisites installed and configured in their computer to be able to join for a stream event which can be prohibitive for clients using a specific video streaming platform.

Embodiments herein recognize that screen sharing tools associated with existing approaches provide clients to a variety of devices. In practice the tools fail to provide a seamless experience to the user across all different platforms and users are affected when have access video stream platforms not properly supported or configured. There are several methods to perform a video streaming and screen sharing and the methods can consume significant resources. Client software installation may be required to transmit video, and there can be hardware requirements associated to an installation. Video streaming e.g. including screen display sharing can be performed using a web browser with plug-ins installed, that can require software compatibility. Utilizing an appliance to perform video conferencing and sharing video between clients can generate significant technology infrastructure demand. Embodiments herein allow a presenter in a web conference to choose one web conferencing tool from a single console, providing a unique interface to the user, but also limiting the delivery to a single tool. According to existing approaches a web conference presenter can to initiate different platform to share video e.g. screen display content simultaneously, but the network performance can be expected to be degraded due to Internet bandwidth and/or client resource restrictions (opening many web conference client applications at once).

Embodiments herein can reduce or eliminate technical problems occurring during a web conference based webinar or virtual meeting, as the clients can choose the best tool to join the conference. Embodiments herein can provide increased availability and capacity of web conference services accessible from a client computer device. For example, it has been observed that in many cases web-conference tools reach a maximum capacity of users connected, limiting the audience. Embodiments herein recognize that in other scenarios a particular tool may present availability issues, so the users still have other options to join the conference. Embodiments herein can eliminate device compatibility issues. For example, embodiments herein recognize that client computer devices running a LINUX® OS sometimes have difficulties join web conferences supported by tools designed to run on client computer devices running a WINDOWS® OS or MACINTOSH® OS.

Embodiments herein can combine multiple technologies, including e.g. streaming, cloud computing and web conferencing to address problems faced by presenters during web conferencing sessions. Embodiments herein can allow presenters to reach a broader audience, reduce technical difficulties and increase availability of a single platform by multicasting a web conference shared screen session through different providers. To the audience comprising web conference viewers, embodiment herein provide the ability to choose their favorite provider specific web conference client application which may be a client application which features improved performance on the user's device.

Embodiments herein can employ a multiple web conference provider client application 125 on a presenter's machine provided by client computer device 120A to relay a local screen of the client computer device 120A provided by a shared screen display 102 to a streaming service provided by streaming service system 110 capable of creating a group of relay servers provided by virtual machines 116-116Z connected to different conference provider systems 140A-140Z. The relays provided by VMs 116A-116Z can be cloud based resources pooled and created on demand. Each relay server provided by a VM 116A-116Z can be capable of receiving a video stream defining an overlay screen display 102A that overlays the VMs real screen 101A-101Z, and at the same time can connect to the target provider conference provider system 140A-140Z using an official client provided by a provider specific web conference client application 117A-117Z running on each respective VM 116A-116Z. Viewer users using client computer devices 120B-120Z which can run provide specific web conference client applications can view the presenter's shared screen using the standard vendor conference client provided by the provider specific web conference client application running on the respective client computer devices 120B-120Z.

In accordance with aspects provided herein client computer devices 120B-120Z servicing as viewer client computer devices can participate in web conferences in which screen display 102 is shared globally across multiple web conference platforms, and can view such content with use of respective installed provider specific web conference client applications running respectively thereon and can be absent of any specialized software in addition to such respective provider specific web conference client applications.

Streaming service system 110 can receive a video stream defined by iteratively captured screen displays from the presenter captured by screen capture process 123 running as part of multiple provider web conference client application 125 and can clone the signal provided by the video stream to multiple relay servers which can be provided by VMs 116A-116Z. Streaming service system 110 can automatically activate running of a proper provider specific web conference client application running on each VM of the allocated VMs 116A-116Z and can connect to the correct conference session being facilitated by a select one conference provider system of conference provider systems 140A-140Z in accordance with web conference service selection data included with presenter user defined configuration data received by streaming service system 110.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, streaming service system 110 can include one or more computing node 10 and can include one or more program 40 for performing functions described with reference to method 300 of FIG. 3 and and functions described with reference to streaming service system 110 as set forth in the flowchart of FIG. 4. In one embodiment, client computer device 120A can include one or more computing node 10 and can include one or more program 40 for performing functions described with reference to client computer device 120A as set forth in the flowchart of FIG. 4. In one embodiment, client computer device 120B can include one or more computing node 10 and can include one or more program 40 for performing functions described with reference to client computer device 120B as set forth in the flowchart of FIG. 4. In one embodiment, client computer device 120C can include one or more computing node 10 and can include one or more program 40 for performing functions described with reference to client computer device 120C as set forth in the flowchart of FIG. 4. In one embodiment, client computer device 120D can include one or more computing node 10 and can include one or more program 40 for performing functions described with reference to client computer device 120D as set forth in the flowchart of FIG. 4. In one embodiment, conference provider system 140A can include one or more computing node 10 and can include one or more program 40 for performing functions described with reference to conference provider system 140A as set forth in the flowchart of FIG. 4. In one embodiment, conference provider system 140B can include one or more computing node 10 and can include one or more program 40 for performing functions described with reference to conference provider system 140B as set forth in the flowchart of FIG. 4. In one embodiment, the computing node based systems and devices depicted in FIG. 1 and FIG. 2 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for sharing screen displays as set forth herein. The processing components 96 can be implemented with use of one or more program 40 described in FIG. 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method comprising:
    receiving from a presenter local client computer device an iteratively captured screen display of the presenter local client computer device;
    multicasting the iteratively received captured screen display to a first virtual machine and a second virtual machine, the first virtual machine running a first provider specific web conference client application associated to a first web conference provider system, the second virtual machine running a second provider specific web conference client application associated to a second web conference provider system, and cloning by the first virtual machine and the second virtual machine the iteratively captured screen display to provide respective instances of a cloned iteratively captured virtual screen display;
    sending by the first virtual machine a first instance of the cloned virtual screen display to the first web conference provider system for sharing with a first one or more viewer local client computer device connected to the first web conference provider system and participating in a web conference supported by the first web conference provider system; and
    sending by the second virtual machine a second instance of the cloned virtual screen display to the second web conference provider system for sharing with a second one or more viewer local client computer device connected to the second web conference provider system and participating in a web conference supported by the second web conference provider system, wherein the method includes sending by the second virtual machine the second instance of the cloned virtual screen display to the second web conference provider system simultaneously with the sending by the first virtual machine the first instance of the cloned virtual screen display to the first web conference provider system.

2. The method of claim 1, wherein the presenter local client computer device runs a multiple web conference provider client application to iteratively capture the screen display of the presenter local client computer and to unicast the iteratively captured screen display to a streaming service system performing the multicasting.

3. The method of claim 1, wherein a streaming service system performing the multicasting allocates one virtual machine for each web conference system designated for sharing of screen displays specified in presenter user defined configuration data received from the presenter local client computer device by the streaming service system.

4. The method of claim 1, wherein a streaming service system performing the multicasting receives from the presenter local client computer device presenter user defined configuration data, the presenter user defined configuration data specifying web conference provider services to which captured screen displays of the presenter local client computer device are to be shared.

5. The method of claim 1, wherein a streaming service system performing the multicasting to define an allocated set of virtual machines allocates one virtual machine for each web conference system designated for sharing of screen displays specified in presenter user defined configuration data received from the presenter local client computer device by the streaming service system, wherein the allocated set of virtual machines includes the first virtual machine and the second virtual machine, and wherein the streaming service system is configured to maintain a number of running virtual machines of the streaming service system equal to or greater than a number of virtual machines of the allocated set of virtual machines for avoidance of virtual machine instantiation delay in response to an initiation of a screen display sharing session.

6. The method of claim 1, wherein a streaming service system performing the multicasting to define an allocated set of virtual machines allocates one virtual machine for each web conference system designated for sharing of screen displays specified in presenter user defined configuration data received from the presenter local client computer device by the streaming service system, wherein the allocated set of virtual machines includes the first virtual machine and the second virtual machine, and wherein the streaming service system is configured to maintain a number of running virtual machines of the streaming service system equal to or greater than a number of virtual machines of the allocated set of virtual machines for avoidance of virtual machine instantiation delay in response to an initiation of a screen display sharing session, and wherein the streaming service system for maintaining the number of running virtual machines of the streaming services system equal to or greater than a number of virtual machines of the allocated set of virtual machines examines a current capacity utilization level of running virtual machines of the streaming service system, decommissions one or more running virtual machine based on a determination that the current capacity utilization level is below a low threshold, and instantiates one or more new running virtual machine based on a determination that the current capacity utilization level exceeds a high threshold.

7. The method of claim 1, wherein a streaming service system performing the multicasting to define an allocated set of virtual machines allocates one virtual machine for each web conference system designated for sharing of screen displays specified in presenter user defined configuration data received from the presenter local client computer device by the streaming service system, wherein the allocated set of virtual machines includes the first virtual machine and the second virtual machine, and wherein the streaming service system determines that a current capacity utilization level exceeds a high threshold and responsively instantiates one or more new running virtual machines to maintain a number of running virtual machines supported by the streaming service system to be equal to or greater than a number of virtual machines of the allocated set of virtual machines for avoidance of virtual machine instantiation delay in response to an initiation of a screen display sharing session.

8. The method of claim 1, wherein a streaming service system performing the multicasting to define an allocated set of virtual machines allocates one virtual machine for each web conference system designated for sharing of screen displays specified in presenter user defined configuration data received from the presenter local client computer device by the streaming service system, wherein the allocated set of virtual machines includes the first virtual machine and the second virtual machine, and wherein the streaming service system determines that a current capacity utilization level exceeds a high threshold and responsively instantiates one or more new running virtual machines to maintain a number of running virtual machines supported by the streaming service system to be equal to or greater than a number of virtual machines of the allocated set of virtual machines, wherein the streaming service system is configured so that when the streaming service system instantiates a new certain running virtual machine, the certain running virtual machine has preinstalled thereon a plurality of provider specific web conference client applications, and wherein the streaming service system is configured so that when the streaming service system allocates the certain running virtual machine to a certain web conference provider system, the streaming service system opens and runs one of the plurality of provider specific web conference client applications.

9. The method of claim 1, wherein the method includes restricting each of the first virtual machine and the second virtual machine from running more than one provider specific web conference application.

10. The method of claim 1, wherein the first virtual machine and the second virtual machine are virtual machines selected from the group consisting of hypervisor based virtual machines and container based virtual machines.

11. The method of claim 1, wherein the first virtual machine, the second virtual machine and a multicast process for performing the multicasting are commonly hosted by a common physical host node.

12. A computer program product comprising:
a computer readable storage medium readable by one or more processing circuit and storing instructions for execution by one or more processor for performing a method comprising:
receiving from a presenter local client computer device an iteratively captured screen display of the presenter local client computer device;
multicasting the iteratively received captured screen display to a first virtual machine and a second virtual machine, the first virtual machine running a first provider specific web conference client application associated to a first web conference provider system, the second virtual machine running a second provider specific web conference client application associated to a second web conference provider system, and cloning by the first virtual machine and the second virtual machine the iteratively captured screen display to provide respective instances of a cloned iteratively captured virtual screen display;
sending by the first virtual machine a first instance of the cloned virtual screen display to the first web conference provider system for sharing with a first one or more viewer local client computer device connected to the first web conference provider system and participating in a web conference supported by the first web conference provider system; and
sending by the second virtual machine a second instance of the cloned virtual screen display to the second web conference provider system for sharing with a second one or more viewer local client computer device connected to the second web conference provider system and participating in a web conference supported by the second web conference provider system, wherein the method includes sending by the second virtual machine the second instance of the cloned virtual screen display to the second web conference provider system simultaneously with the sending by the first virtual machine the first instance of the cloned virtual screen display to the first web conference provider system.

13. A system comprising:
a memory;
at least one processor in communication with the memory; and
program instructions executable by the one or more processor via the memory to perform a method comprising:
receiving from a presenter local client computer device an iteratively captured screen display of the presenter local client computer device;
multicasting the iteratively received captured screen display to a first virtual machine and a second virtual machine, the first virtual machine running a first provider specific web conference client application associated to a first web conference provider system, the second virtual machine running a second provider specific web conference client application associated to a second web conference provider system, and cloning by the first virtual machine and the second virtual machine the iteratively captured screen display to provide respective instances of a cloned iteratively captured virtual screen display;
sending by the first virtual machine a first instance of the cloned virtual screen display to the first web conference provider system for sharing with a first one or more viewer local client computer device connected to the first web conference provider system and participating in a web conference supported by the first web conference provider system; and sending by the second virtual machine a second instance of the cloned virtual screen display to the second web conference provider system for sharing with a second one or more viewer local client computer device connected to the second web conference provider system and participating in a web conference supported by the second web conference provider system, wherein the method includes sending by the second virtual machine the second instance of the cloned virtual screen display to the second web conference provider system simultaneously with the sending by the first virtual machine the first instance of the cloned virtual screen display to the first web conference provider system.

14. The system of claim 13, wherein the first virtual machine running the first provider specific web conference client application associated to the first web conference provider system emulates the operation of a presenter user local client computer device participating in a web conference facilitated and supported by the first web conference provider system, wherein the second virtual machine running the second provider specific web conference client application associated to the second web conference provider system emulates the operation of a presenter local client computer device participating in a web conference facilitated and supported by the second web conference provider system, wherein the first web conference provider system is operated by a first enterprise, wherein the second web conference provider system is operated by a second enterprise.

15. The system of claim 13, wherein the first virtual machine running the first provider specific web conference client application associated to the first web conference provider system emulates the operation of a presenter user local client computer device participating in a web conference facilitated and supported by the first web conference provider system, wherein the second virtual machine running the second provider specific web conference client application associated to the second web conference provider system emulates the operation of a presenter user local client computer device participating in a web conference facilitated and supported by the second web conference provider system, wherein the first virtual machine runs an overlay process in which the first virtual machine overlays the iteratively received captured screen display received by the first virtual machine via the multicasting onto an underlying virtual machine display of the first virtual machine, wherein the second virtual machine runs an overlay process in which the second virtual machine overlays the iteratively received captured screen display received by the second virtual machine via multicasting onto an underlying virtual machine display of the second virtual machine, wherein the first web conference provider system is operated by a first enterprise, wherein the second web conference provider system is operated by a second enterprise.

16. The system of claim 13, wherein the first virtual machine running the first provider specific web conference client application associated to the first web conference provider system emulates the operation of a presenter user local client computer device participating in a web conference facilitated and supported by the first web conference provider system, wherein the second virtual machine running the second provider specific web conference client application associated to the second web conference provider system emulates the operation of a presenter userlocal client computer device participating in a web conference facilitated and supported by the second web conference provider system, wherein the first web conference provider system is operated by a first enterprise, wherein the second web conference provider system is operated by a second enterprise, wherein the first enterprise has provided the first provider specific web conference client application, wherein the second enterprise has provided the second provider specific web conference client application, wherein the sending by the first virtual machine a first instance of the cloned virtual screen display to the first web conference provider system includes performing the sending using the first provider specific web conference client application, and wherein the first virtual machine includes the second provider specific web conference client application preinstalled thereon but in an inactive state.

17. The system of claim 13, wherein the first one or more viewer local client computer device is provided by multiple viewer local client computer devices, wherein the first web conference provider system is external from each of the multiple viewer local client computer devices and connected to the each of the multiple viewer local client computer devices by a telecommunications network.

18. The system of claim 13, wherein the first one or more viewer local client computer device is provided by multiple viewer local client computer devices, wherein the first web conference provider system is external from (a) a computing node hosting the first virtual machine, (b) the second web conference provider system, and (c) each of the multiple viewer local client computer devices and connected to (a) a computing node hosting the first virtual machine, (b) the second web conference provider system, and (c) each of the multiple viewer local client computer devices by a telecommunications network, wherein the first virtual machine running the first provider specific web conference client application associated to the first web conference provider system emulates the operation of a presenter user local client computer device participating in a web conference facilitated and supported by the first web conference provider system, wherein the second virtual machine running the second provider specific web conference client application associated to the second web conference provider system emulates the operation of a presenter user local client computer device participating in a web conference facilitated and supported by the second web conference provider system, wherein the first web conference provider system is operated by a first enterprise, wherein the second web conference provider system is operated by a second enterprise, wherein the first enterprise has provided the first provider specific web conference client application, wherein the second enterprise has provided the second provider specific web conference client application, wherein the sending by the first virtual machine a first instance of the cloned virtual screen display to the first web conference provider system includes performing the sending using the first provider specific web conference client application, and wherein the first virtual machine includes the second provider specific web conference client application preinstalled thereon but in an inactive state.

19. The system of claim 13, wherein the first virtual machine and the second virtual machine are commonly hosted by a common physical host node.

* * * * *